Dec. 9, 1930.                R. D. PARRY                1,784,642
                        ELECTRICAL REGULATOR
                    Filed May 11, 1928        2 Sheets-Sheet 1
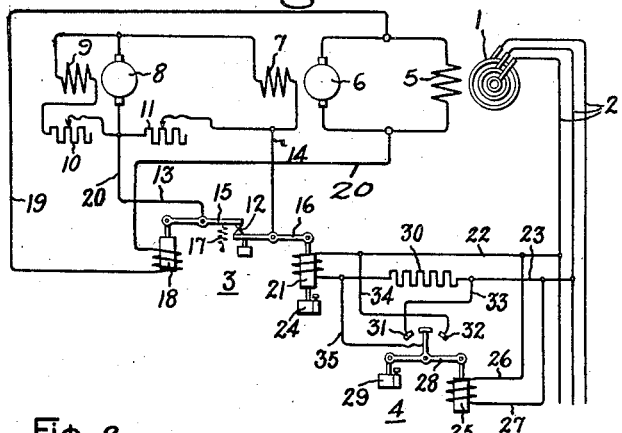
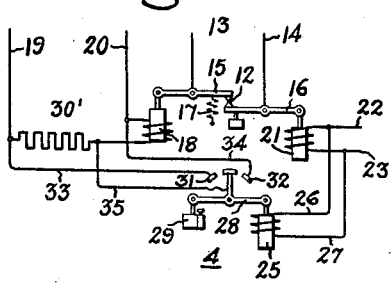
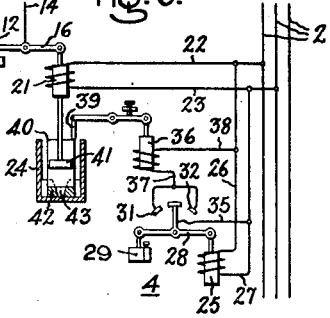
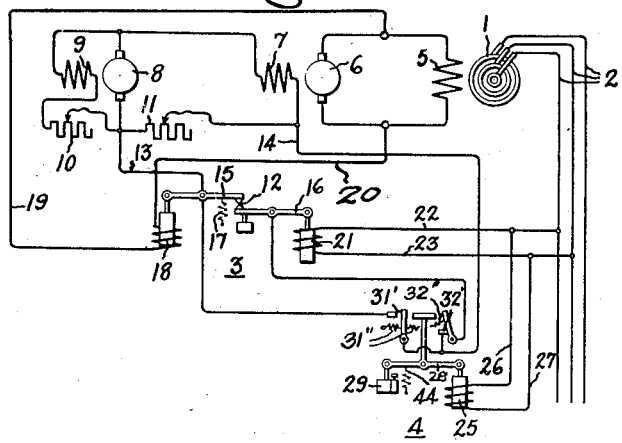
Inventor:
Robert D. Parry.
by Charles E. Tullar
His Attorney.

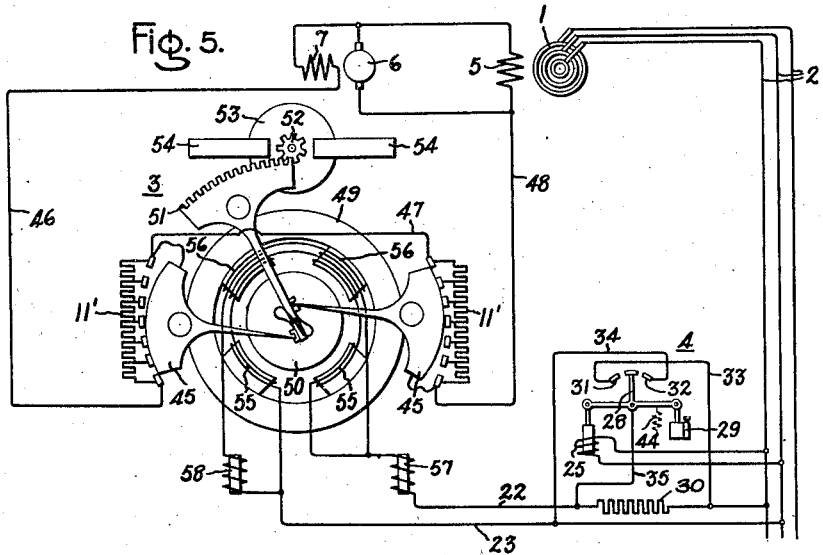
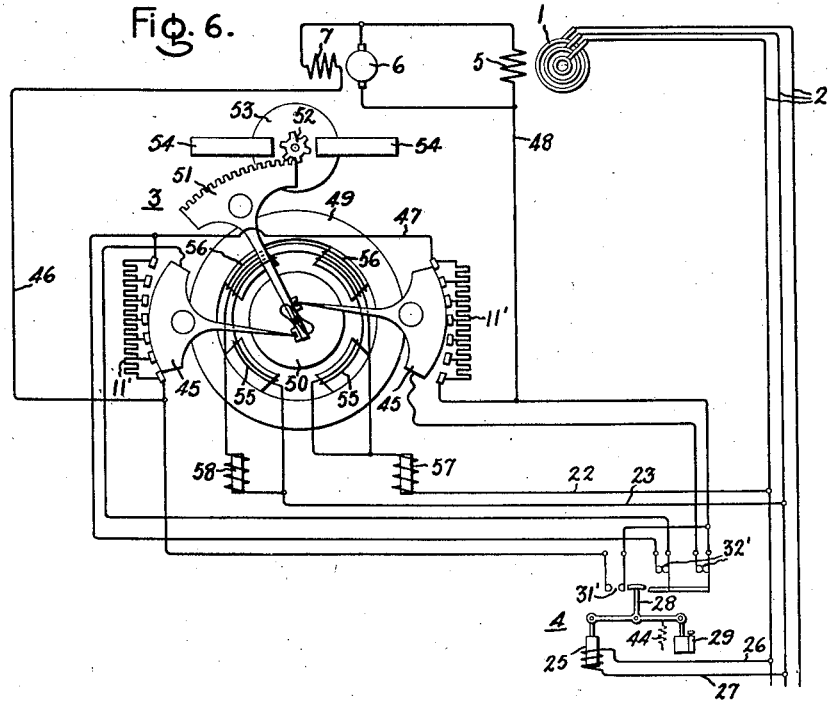

Patented Dec. 9, 1930

1,784,642

UNITED STATES PATENT OFFICE

ROBERT D. PARRY, OF NORTHWAY, ENGLAND, ASSIGNOR TO GENERAL ELECTRIC COMPANY, A CORPORATION OF NEW YORK

ELECTRICAL REGULATOR

Application filed May 11, 1928, Serial No. 277,036, and in Great Britain May 16, 1927.

My invention relates to electrical regulators and more particularly to regulators and regulating systems for controlling the excitation of a dynamo-electric machine to control an electrical characteristic thereof. Although not limited thereto my invention is particularly applicable for use in connection with vibratory regulators of synchronous alternating current machines such as synchronous alternating current generators and synchronous condensers.

Studies accompanying the advent of extensive power transmission systems have disclosed the fact that the excitation of the synchronous machines of a power transmission system plays an important part in the problem of system stability and that it is desirable to obtain for any new load condition in the system the desired change in excitation in a time sufficient to prevent a voltage change at the synchronous machine great enough to cause instability or loss of synchronism between the synchronous machines of the system.

Some regulators have an inherent time-lag due to the inertia of the moving parts while other inherently quick-acting regulators, particularly regulators of the vibratory type, have retarding or damping means to prevent hunting. The time-lag of a regulator does not necessarily affect its correct operation for slow changes or where the characteristic to be regulated varies between small limits. It is, however, a source of trouble when the characteristic suddenly varies from normal more than a predetermined amount. For example, if the characteristic to be regulated is the voltage of a generator, the importance of the regulator immediately effecting the necessary regulation will clearly be recognized. An ordinary voltage regulator starts to respond to changes of load almost immediately. It is, in fact, highly successful when the changes of load to be dealt with are slow and relatively small. If the changes of load are relatively large and sudden, however, the time-lag above referred to operates to cause the regulator to act step-by-step or progressively. For example, the dashpot of a Tirrill-type regulator causes the regulated voltage element to take an appreciable time on moving to its new position such that the ratio of time closed to time open of the vibratory contacts will be that necessary to maintain the excitation of the generator at the average value required for the new load condition. As the size of generators and as the lengths of transmission lines increase, it is becoming more and more important that a voltage regulator shall respond fully in as short a time as possible to all changes in the line voltage or any other characteristic which is being regulated.

It is an object of my invention to provide an improved regulator and system of regulation for the synchronous equipment of power transmission systems for improving stability of operation.

Another object of my invention is to provide improved means for modifying the action of a regulator utilized in connection with a dynamo-electric machine when said machine is subjected to sudden load changes.

A further object of my invention is the provision of improved means to change the time of response of the movable element or elements of a regulator utilized in connection with a dynamo-electric machine when said machine is subjected to sudden and substantial changes in the characteristic regulated.

A still further object of my invention is the provision of a regulator in which the movable element or elements thereof will have a quicker response when the characteristic which is to be regulated deviates from a normal value more than a predetermined amount than when the deviation is less than said predetermined amount.

The novel features which I believe to be characteristic of my invention are set forth with particularity in the appended claims, the invention itself; however, both as to organization and method of operation together with further objects and advantages thereof will best be understood by reference to the following description taken in connection with the accompanying drawings in which Fig. 1 is a diagrammatic illustration of an embodiment of my invention in a regulating system comprising a regulator of the vibratory type, Figs. 2, 3 and 4 are modifications of the arrangement shown in Fig. 1, Fig. 5 is a diagrammatic illustration of an embodiment of my invention in a regulating system comprising a regulator of the non-vibratory type, and Fig. 6 is a modification of the arrangement shown in Fig. 5. In all of the figures the same reference numerals are used for corresponding elements as far as possible.

Referring to Figs. 1, 4, 5 and 6, a dynamo-electric machine 1 illustrated diagrammatically as an alternating current generator is connected to a distribution circuit 2. The excitation of the generator is arranged to be controlled mainly through the operation of the regulator 3 and partly through the agency of the auxiliary relay 4.

In Figs. 1 and 4, the generator 1 is shown as being provided with a field winding 5 which is separately excited from the main exciter 6, which in turn is provided with a field winding 7 which is separately excited from the auxiliary exciter 8. The shunt field winding 9 of the auxiliary exciter is connected in series with an adjustable rheostat 10, by which the output of the auxiliary exciter can be adjusted to a predetermined value. Connected in series with the field winding 7 is circuit controlling means shown as an adjustable rheostat 11 having its operative terminals connected to be periodically short-circuited by the regulator 3. Regulator 3 is of the well known Tirrill-type and comprises cooperating contacts 12 which are connected across rheostat 11 by conductors 13 and 14. For simplicity of illustration, contacts 12 are shown operating directly across the resistor 11 but the well known intermediate relay or relays may be used if preferred without departing from my invention in its broader aspects. Contacts 12 are supported on pivoted contact arms 15 and 16. The arm 15 which is the vibratory element of the regulator is biased by a spring 17 which tends to move the arm in a direction to tend to effect engagement between the contacts. The movement of arm 15 is controlled by an electromagnet 18 which is connected to be energized in accordance with the voltage of the excitation circuit and as shown is connected across the exciter 6 by leads 19 and 20. The movable element 16 is biased by gravity or otherwise to move in a direction also tending to effect engagement between the contacts and is provided with an operating electromagnet 21, the winding of which is connected by leads 22 and 23 to be energized from the circuit 2 in accordance with the characteristic to be regulated. The usual retarding or damping device 24, such as a dash-pot, is associated with the moving element of electromagnet 21 for the purpose of eliminating hunting of the regulator.

The regulating system thus far described will operate to regulate the voltage of machine 1 in a manner which is well understood in the art. If the voltage varies from its normal or predetermined value by a relatively small amount the regulator 3 varies the voltage applied to field winding 5 to effect the return of the voltage to its normal value.

Now in accordance with my invention I provide the auxiliary relay 4 to modify the operation of regulator 3 for sudden and large changes in the regulated characteristic. Relay 4 includes an electromagnet 25, the winding of which is connected by the leads 26 and 27 to the leads 22 and 23 to be energized from circuit 2. The movable element of this relay includes a contact-operating member 28 and a retarding device 29, shown diagrammatically in the form of a dash-pot. This dash-pot should give only minimum damping so that the movable element can readily respond to the predetermined changes in the characteristic regulated.

Referring now more particularly to Fig. 1, a resistor 30 is shown connected in series with the winding of electromagnet 21. Moreover, the movable element 28 of the auxiliary relay 4 is arranged to cooperate with oppositely disposed contacts 31 and 32. Contact 31 is connected by the lead 33 directly to the lead 23, and contact 32 is connected by lead 34 directly to lead 22. The common point of the resistor 30 and the winding of electromagnet 21 is connected by lead 35 to the movable element 28.

The operation of the arrangement shown in Fig. 1 is substantially as follows: So long as the voltage of circuit 2 varies within predetermined limits from normal, the movable element 28 of auxiliary relay 4 does not engage either of the contacts 31 or 32, and under these codnitions, the voltage of generator 1 is regulated entirely by means of the vibratory regulator 3 operating periodically to short-circuit the operative portion of resistor 11. The movable element 28 of relay 4 is biased by gravity to move in a clockwise direction, and while the voltage of circuit 2 is normal or within predetermined limits on each side of normal the movable element 28 is held in an intermediate position between the cooperating contacts 31 and 32 by the pull of magnet 25. If, however, a considerable load is sudenly removed from circuit 2 and the voltage thereof increases above normal by an amount which is greater than some predetermined value (for example, 2% of normal voltage), then the auxiliary relay 4 comes into operation. The core of electromagnet 25 is drawn further up into its solenoid and rotates the movable member 28 in a counter-clockwise direction into engagement with contact 31. This places a short-circuit around the resistor 30. In consequence a considerably large voltage is applied to the winding of electromagnet 21, which causes the element 16 of the regulator to move relatively rapidly in a contact-opening direction. This in turn changes the ratio of time closed to time open of the vibratory contacts to a greater extent and more quickly than would occur with such a regulator when the action thereof is not modified according to the invention. The reduction in voltage applied to field winding 7 causes a decrease in the voltage of generator 1. When the voltage of generator 1 falls from its previous high value to a value which does not exceed normal by a predetermined amount, for example 2% of normal, the auxiliary relay 4 resets and the closed circuit around resistor 30 is opened at contact 31, whereupon the regulation is again placed entirely under the control of vibratory regulator 3.

In the event of the voltage of circuit 2 falling below a predetermined value (say 98% of normal voltage) due to a sudden application of a considerable load, the movable element 28 of the auxiliary relay 4 is operated into engagement with the fixed contact 32 thus providing a short-circuit for the winding of the electromagnet 21. In this case, therefore, the movable element 16 moves relatively rapidly under its bias without any electromagnetic restraining effect in a contact-making position of the main contacts of regulator 3 and the main contact 12 associated with element 16 will, therefore, assume its correct position for the conditions obtaining in a shorter time interval than would the main contact of such a regulator when not arranged according to the invention. The consequent change in the ratio of time closed to time open of the main vibratory contacts 12 acts to raise the voltage of circuit 2 until, when the voltage is again within a predetermined distance of normal voltage, the closed circuit around the winding of electromagnet 21 is opened at contact 32. The movable element 28 of relay 4 assumes its intermediate position and the control of generator 1 is performed solely by regulator 3.

Fig. 2 illustrates a modification of the invention and shows how the principle involved in this regulator and system of regulation may be carried out by modifying the action of the vibratory lever system. For simplicity of illustration I have simply shown a portion of the system shown in Fig. 1 but the manner in which the parts are connected will be evident since like numerals have been used for the conductors from various terminals of the windings as well as for similar parts of the regulator and auxiliary relay. The system is modified to the extent of introducing a resistor 30' in series with the vibrator electromagnet 18 instead of magnet 21. The winding of electromagnet 18 and the resistor 30' are arranged to be selectively short-circuited by the auxiliary relay 4 in the same manner as previously described according to the direction from normal in which the voltage of generator 1 varies more than a predetermined amount. Thus, if the main contact 12 associated with the excitation-controlled element 15 is biased to move towards its cooperating contact when the voltage of circuit 2 falls below a predetermined value, the auxiliary relay, on operating, is arranged to short-circuit the winding of electromagnet 18, thus allowing the main contact under its bias to remain in engagement with its cooperating contact, irrespective of the position of the latter. In like manner, when the voltage of circuit 2 exceeds the predetermined value, the relay 4 is arranged to short-circuit the resistor 30' in series with the winding of electromagnet 21 thus tending to hold the contact associated with arm 15 away from its cooperating contact.

Fig. 3 illustrates another modification of the invention and shows how the principle involved in this regulator and system of regulation may be carried out by modifying the action of the retarding device of the regulator. For simplicity of illustration I have simply shown a portion of the system shown in Fig. 1 but the manner in which the parts are connected will be evident since like numerals have been used for the conductors from various terminals of the windings as well as for similar parts of the regulator and auxiliary relay. The plunger of the electromagnet 21 and the retarding device 24 are the same as shown in Fig. 1 except that the dash-pot is drawn to slightly larger scale and is of special construction. The auxiliary relay 4 is again provided with an electromagnet 25 and with a retarding device 29, but in this case the fixed relay contacts 31 and 32 are both connected to the winding of an additional relay 36 by means of the lead 37. The movable element 28 is again connected to the lead 23 by the lead 35 (no resistor 30 being included in this circuit in this case) and the lead 38 is shown connecting the winding of relay 36 directly to the lead 22. The movable element of the relay 36 is linked by the rod 39 to a slidable sleeve 40 within which the piston 41 of the dash-pot 24 operates. The lower end of the casing of dash-pot 24 is provided with an annular flange 42 having a number of V-shaped openings 43; the arrangement illustrated in the drawing being one in which four such openings 43 are provided. The normal position of the sleeve 40 is that illustrated, in which the lower end of the sleeve extends half-way down through the flange 42.

The operation of this arrangement is substantially as follows: In the event of the voltage across circuit 2 increasing above normal by a predetermined amount, the movable element 28 of the auxiliary relay 4 is operated to engage the fixed contact 31 thus effecting energization of the winding of the additional relay 36. In the event of the voltage across circuit 2 falling from normal by a predetermined amount, the movable element 28 moving under its bias engages fixed contact 32, again effecting the energization of the winding of the additional relay 36. Now, whenever the winding of the additional relay 36 is energized the sleeve is raised to uncover fully or partially more of the V-shaped slots 43. It will be evident that this operation will reduce the time-lag of the retarding device 24. Consequently, with this arrangement, whenever the voltage of circuit 2 varies in either direction from normal by the predetermined percentage, the delaying power of the retarding device 24 is reduced and the core of the electromagnet 21 is, therefore, able more quickly to take up a position such that the vibratory regulator 3 can operate to maintain the excitation of the field winding 7 at the value required for the correct regulation of generator 1. When the voltage of generator 1 has been brought back within the predetermined limits on each side of normal, the auxiliary relay 4 operates to effect the deenergization of the winding of the additional relay 36, and the sleeve 40 again sinks to its biased position, which is that illustrated in Fig. 3 thus again increasing the delaying power of the retarding device 24.

In the arrangement illustrated in Fig. 4 the auxiliary relay 4 instead of operating selectively to short-circuit a resistor in series with one of the windings of the vibratory regulator 3, or the winding itself, is shown connected to take over the control of the operative portion of the resistor 11 from the contacts 12 of vibratory regulator 3 when the voltage across circuit 2 varies in either direction from normal by the predetermined percentage. The auxiliary relay 4 is again provided with an electromagnet 25, a movable element 28 and a retarding device 29, but in this case the movable element 28 is adapted to cooperate with two pairs of cooperating contacts, which are here marked 31' and 32', respectively. Contacts 32', which are maintained closed by suitable biasing means, such as the spring 32'', when the movable element of the auxiliary relay 4 is in its normal position, are connected in series between the movable element 16 and one end of the adjustable rheostat 11, that is, in the circuit of the lead 14. Contacts 31' are normally maintained in a non-circuiting closing position by suitable means, such as the springs 31'', and are connected, respectively, to the leads 13 and 14. Furthermore, in this case the auxiliary relay 4 is provided with the biasing spring 44, such that when the winding of electromagnet 25 is deenergized contacts 31' will be closed. When contacts 31' are closed the operative portion of the resistor 11 is short-circuited.

The operation of this arrangement is substantially as follows: In the event of the voltage of circuit 2 increasing above normal, say 2%, the auxiliary relay operates to effect the opening of contacts 32'. This opens the short-circuit across the operative portion of resistor 11 independently of the separation of the vibratory contacts 12, with the result that the operative portion of the resistor 11 is for the time being in circuit with the field winding 7. This acts rapidly to lower the voltage generated by the machine 1, and on this voltage again becoming within a predetermined percentage of normal, the movable element 28 of the auxiliary relay 4 returns to its normal position, and regulation is again taken care of by the vibratory regulator 3, as in ordinary practice. In the event of the voltage of circuit 2 falling below its normal value by a predetermined amount, say 2%, the movable element 28 of the auxiliary relay 4 operates under its bias and effects the closure of contacts 31'. This operation effects for the time being the continuous short-circuiting of the operative portion of resistor 11, independently of the closing of the vibratory contacts 12, thus allowing the generated voltage of machine 1 to build up rapidly until it is again within predetermined percentage of normal, when the auxiliary relay 4 returns to its illustrated position, and the regulation is again carried on by the vibratory regulator 3.

The manner in which the principles outlined above are applied to the rheostatic or torque-type regulators can, it is believed, be easily understood from a consideration of the following description taken in connection with Figs. 5 and 6. In these figures the dynamo-electric machine 1 is shown as a three-phase generator connected to a distribution circuit 2 and having a main exciter 6 provided with a shunt connected field winding 7. The resistor in series with the field winding 7 is shown in two sections 11'. These resistor sections are adapted to be short circuited by the contact making members 45. The resistor sections are connected in series with the exciter field winding 7 by means of the leads 46, 47 and 48.

The regulator 3 of Figs. 5 and 6 consists of a stator 49 and a rotor 50. The rotor is biased to an "off" position and is flexibly connected with the movable members 45 so as to operate them in a manner to make a rolling contact with the contacts of the resistor sections 11'. The contact making members 45 are shown in their biased position which they occupy when the resistor sections 11' are short circuited. Movable with the rotor is a gear sector 51 arranged to mesh with the gear wheel 52 associated with the conducting disk 53 adapted to operate within the sphere of influence of the drag magnets 54 whereby the regulator 3 will work with a definite time-lag. The stator is shown as comprising four salient poles each provided with a coil 55 and two of which are provided with an additional coil 56. The coils 55 are all connected in series to be energized responsively to the voltage of circuit 2 through the phase displacement impedance 57, and the coils 56 are connected in shunt with the coils 55 through the compensating impedance 58. As is well understood in the art, if the voltage of circuit 2 rises above a predetermined value the rotor 50 is actuated in a direction to insert more of the resistors 11' in series with the field winding 7, thus causing the generator voltage to fall. In a similar manner the reverse action of cutting out resistance is obtained if the voltage falls below its normal value.

Referring now more particularly to Fig. 5 the resistor 30 is connected in series with coils 55 and 56. If a sudden load is removed from the circuit 2 causing a rise in voltage greater than the predetermined percentage the auxiliary relay 4 operates against the bias of spring 44 to close contacts 31, thus providing a short-circuit around the resistor 30. The result is that an increased operating torque is applied to the rotor of the regulator 3 and this increased torque serves to drive the rotor and the movable contact making members 45 into positions necessary for the excitation to be held at the required value for the time being in a shorter time than would be taken if the resistor 30 were not short-circuited. In a similar manner if circuit 2 is subjected to a large increment of load, causing the auxiliary relay 4 to operate under its bias in a direction to close contacts 32, all the coils 55 and 56 are short-circuited with the result that the rotor of regulator 3 is able to move in the direction of its bias without any magnetic retarding action in a much shorter time than would otherwise be taken by the regulator to cut out all of the resistors 11'.

The arrangement of the auxiliary relay 4 in Fig. 6 is not materially different from that of Fig. 4 except that there are now two groups of normally closed contacts 32' so that there is one group for each of the resistor sections 11'. It is believed that the operation of this arrangement will be readily understood from a consideration of the foregoing description in connection with Fig. 5 and no further description will therefore be given.

It will be realized that the arrangement illustrated in Fig. 3 in which the action of the retarding device associated with the regulator is varied by the operation of the auxiliary relay could be applied to the torque-type regulator illustrated in Figs. 5 and 6 in a manner to control the action of the drag magnets 54 and may be used, if preferred, without departing from my invention in its broader aspects.

While I have shown several embodiments and modifications of my invention it will be obvious to those skilled in the art that various other modifications and changes may be made without departing from my invention and I, therefore, aim in the appended claims to cover all such changes and modifications as fall within the true spirit and scope of my invention.

What I claim as new and desire to secure by Letters Patent of the United States is:—

1. In combination, a dynamo-electric machine, an excitation circuit therefor, circuit controlling means in said excitation circuit, a regulator operable in accordance with variations in an electrical characteristic of said dynamo-electric machine for controlling said circuit controlling means, and means operable in accordance with an electrical characteristic of said dynamo-electric machine for changing the time of response of said regulator when the departure of said electrical characteristic exceeds a predetermined amount above or below a predetermined normal value.

2. In combination, a dynamo-electric machine, an excitation circuit therefor, a resistor in said excitation circuit, a regulator operable in accordance with variations in an electrical characteristic of said dynamo-electric machine and comprising a movable element for effecting a change in said resistor when an electrical characteristic of said dynamo-electric machine varies within predetermined limits above or below a predetermined normal value, and means operable when the variation of said electrical characteristic exceeds said predetermined limits for effecting a change in the effective value of said resistor within a shorter time interval than when said electrical characteristic varies within said predetermined limits.

3. In combination, a dynamo-electric machine, an excitation circuit therefor, a regulator connected to be responsive to variations in an electrical characteristic of said dynamo-electric machine and comprising a movable element for controlling said excitation circuit, and means responsive to an electrical characteristic of said dynamo-electric machine for changing the time of response of said movable element when the departure of said electrical characteristic exceeds a predetermined amount.

4. In combination, a dynamo-electric machine, an excitation circuit therefor, a regulator comprising a retarded movable element for controlling said excitation circuit, and means responsive to the voltage of said dynamo-electric machine for decreasing the retardation of said movable element when the voltage of said machine departs more than a predetermined amount from a predetermined normal value.

5. In combination, a dynamo-electric machine, an excitation circuit therefor, a regulator comprising a movable element for controlling said excitation circuit, electroresponsive means connected to be responsive to variations in an electrical characteristic of said dynamo-electric machine for actuating said movable element to control an electrical characteristic of said dynamo-electric machine within predetermined limits, a relay responsive to an electrical characteristic of said dynamo-electric machine for changing the energization of said electroresponsive means in a greater degree than the change effected by said electrical characteristic during variations within said predetermined limits when said electrical characteristic changes from a predetermined normal value more than a predetermined amount.

6. In combination, a dynamo-electric machine, an excitation circuit therefor, a regulator comprising a movable element for controlling said excitation circuit, electroresponsive means connected to be energized in accordance with the voltage of said dynamo-electric machine for actuating said movable element, a resistor in series relation with said electroresponsive means, a relay responsive to the voltage of said dynamo-electric machine for closing a circuit in shunt to said resistor when the voltage of said dynamo-electric machine increases more than a predetermined amount from a predetermined normal value and for closing a circuit in shunt to said electroresponsive means when the voltage of said dynamo-electric machine decreases more than a predetermined amount from a predetermined normal value.

7. In combination, a dynamo-electric machine, an excitation circuit therefor, a regulator comprising cooperating contacts for controlling said excitation circuit, electromagnetic means comprising a winding for vibrating one of said contacts, electromagnetic means comprising a winding responsive to the voltage of said dynamo-electric machine for changing the relative position of said contacts, a resistor in series relation with one of the windings of said electromagnetic means, a relay responsive to the voltage of said dynamo-electric machine for short-circuiting said resistor when the voltage of said dynamo-electric machine increases more than a predetermined amount from a predetermined normal value and for short-circuiting the winding of one of said electromagnetic means when the voltage of said dynamo-electric machine decreases more than a predetermined amount from the predetermined normal value.

8. In combination, a synchronous dynamo-electric machine, an excitation circuit therefor, a resistor in said excitation circuit, a pair of cooperating contacts for opening and closing a circuit in shunt to said resistor, electromagnetic means comprising a winding for vibrating one of said contacts, a resistance in series relation with said winding, a relay responsive to the voltage of said synchronous machine for short-circuiting said resistance when the voltage of said synchronous machine increases more than a predetermined amount from a predetermined normal value and for short-circuiting said winding when the voltage of said synchronous machine decreases more than a predetermined amount from the predetermined normal value.

9. In combination, a dynamo-electric machine, an excitation circuit therefor, a resistor in said excitation circuit, a regulator comprising a movable element associated with said resistor for varying the voltage of said excitation circuit, means responsive to the voltage of said dynamo-electric machine for changing the position of said movable element in accordance with the variation of the voltage of said dynamo-electric machine when said variation is within predetermined limits above or below a predetermined normal value, and a relay responsive to the voltage of said dynamo-electric machine for effecting a continued short-circuit of said resistor when said variation is more than a predetermined amount below the predetermined normal value and for effecting a continued insertion of said resistor when said variation is more than a predetermined amount above the predetermined normal value.

10. In combination, a dynamo-electric machine, an excitation circuit therefor, a resistor in said excitation circuit, a regulator comprising cooperating contacts rapidly vibrated for periodically closing and opening a circuit in shunt to said resistor when the variation of the voltage of said dynamo-electric machine is within predetermined limits above or below a predetermined normal value, and a relay responsive to the voltage of said dynamo-electric machine for keeping said resistor short-circuited during the period when said variation is more than a predetermined amount below the predetermined normal value and for keeping the circuit in shunt to said resistor open circuited during the period when said variation is more than a predetermined amount above the predetermined normal value.

11. In combination, an electric circuit, regulating means operative in accordance with variations in an electrical characteristic of said circuit, and control means connected to be responsive to said electrical characteristic for changing the time of response of said regulating means when the departure of said electrical characteristic from a predetermined value exceeds a predetermined amount.

12. In combination, an electric circuit, regulating means operative in accordance with variations in the voltage of said circuit for controlling the voltage of said circuit for departures of voltage below a predetermined amount, and means responsive to said voltage for decreasing the time of response of said regulating means when the departure of said voltage from a predetermined value exceeds a predetermined amount.

13. In combination, an electric circuit, regulating means comprising a movable element for controlling an electrical characteristic of said circuit, electroresponsive means connected to be responsive to an electrical characteristic of said circuit for actuating said movable element in accordance with variations in said electrical characteristic, and a relay responsive to said electrical characteristic for effecting an abnormal change in the energization of said electroresponsive means when the departure of said electrical characteristic above or below a predetermined value exceeds a predetermined amount.

In witness whereof, I have hereunto set my hand this twenty-fourth day of April, 1928.

ROBERT DAVIES PARRY.